United States Patent
Suzuki (10) Patent No.: US 7,193,943 B2
(45) Date of Patent: Mar. 20, 2007

(54) OPTICAL DISK APPARATUS, OPTICAL RECORDING METHOD, OPTICAL RECORDING PROGRAM AND STORAGE MEDIUM

(75) Inventor: Haruyuki Suzuki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 485 days.

(21) Appl. No.: 10/365,398

(22) Filed: Feb. 13, 2003

(65) Prior Publication Data

US 2003/0156514 A1 Aug. 21, 2003

(30) Foreign Application Priority Data

Feb. 21, 2002 (JP) ............... 2002-044286
Sep. 30, 2002 (JP) ............... 2002-285312

(51) Int. Cl.
*G11B 7/00* (2006.01)
(52) U.S. Cl. .................... 369/47.53; 369/53.18
(58) Field of Classification Search ............ 369/47.53, 369/47.52, 47.51, 13.03, 13.14, 13.26, 13.27, 369/116; 250/201.5, 205
See application file for complete search history.

(56) References Cited

U.S. PATENT DOCUMENTS

| | | | |
|---|---|---|---|
| 5,274,622 A | | 12/1993 | Kono |
| 5,392,273 A | | 2/1995 | Masaki et al. |
| 5,726,954 A | * | 3/1998 | Matsumoto et al. ...... 369/13.27 |
| 6,115,338 A | | 9/2000 | Masaki et al. |
| 6,356,515 B1 | * | 3/2002 | Kumita et al. ............ 369/13.26 |
| 6,538,968 B1 | * | 3/2003 | Yamaguchi et al. ...... 369/47.53 |
| 6,633,512 B1 | * | 10/2003 | Kobayashi et al. ....... 369/13.03 |
| 6,781,105 B2 | * | 8/2004 | Yokoi ....................... 250/201.5 |
| 6,845,071 B2 | * | 1/2005 | Shoji et al. ............... 369/47.53 |
| 6,973,016 B2 | * | 12/2005 | Fukushima et al. ........ 369/47.5 |
| 2002/0044507 A1 | | 4/2002 | Hagiwara et al. |
| 2004/0114482 A1 | * | 6/2004 | Yano et al. ............... 369/47.52 |

FOREIGN PATENT DOCUMENTS

| | | |
|---|---|---|
| EP | 1 326 239 A2 | 7/2003 |
| EP | 1 357 550 A1 | 10/2003 |
| EP | 1 365 393 A1 | 11/2003 |
| JP | 2000-293854 | 10/2000 |
| JP | 2001-176141 | 6/2001 |
| JP | 2001-297437 | 10/2001 |
| JP | 2001-297465 | 10/2001 |

\* cited by examiner

*Primary Examiner*—William Korzuch
*Assistant Examiner*—Joseph Haley
(74) *Attorney, Agent, or Firm*—Dickstein Shapiro LLP (57) ABSTRACT

An optical disk apparatus is disclosed. A light emitting element emits a laser beam directed to a recordable optical disk. A driver rotates the optical disk. A first optimum recording power obtaining part performs test recording on the optical disk while the optical disk is rotated by the driver and output power of the light emitting element is varied so as to obtain an optimum recording power based on a reproduction signal in a test recorded area. A temperature measuring part measures the temperature in the vicinity of the light emitting element. A memory stores the optimum recording power obtained by the first optimum recording power obtaining part and the measured temperature when the optimum recording power is obtained. A temperature-dependent recording power obtaining part refers to the optimum recording power and the associated temperature stored in the memory so as to obtain an optimum recording power according to the temperature measured by the temperature measuring part in real recording. A target recording power setting part sets the optimum recording power obtained by the temperature-dependent recording power obtaining part to a target recording power in the real recording.

13 Claims, 4 Drawing Sheets

OPTICAL DISK APPARATUS, OPTICAL RECORDING METHOD, OPTICAL RECORDING PROGRAM AND STORAGE MEDIUM

BACKGROUND OF THE INVENTION

1. Field of the Invention

The present invention generally relates to optical disks such as CD-Rs, DVD-Rs and DVD+Rs that use organic dye for a recording layer so that information can be written thereon. In such optical disks, the number of times of recording is once (Write Once) according to the characteristics of the organic dye used for the recording layer.

2. Description of the Related Art

It is possible to record/reproduce information to/from such optical disks by using an optical disk apparatus having a light emitting element emitting a laser beam and capable of properly varying the output power of the laser beam emitted from the light emitting element. For example, some conventional optical disk apparatuses perform real recording at optimum recording power by, before starting the real recording to an optical disk, test recording information to the optical disk, and obtaining the optimum recording power based on the characteristics of a reproduction signal obtained by reproducing a test recorded area. Hence, it is possible to achieve a good recording quality. Hereinafter, obtaining optimum recording power based on a reproduction signal from a test recorded area is referred to as OPC (Optimum Power Control). Also, the area on an optical disk that allows test recording in the OPC is referred to as a PCA (Power Calibration Area).

Recording sensitivity of an optical disk varies relatively drastically with respect to wavelength variation of the laser beam emitted from the light emitting element in recording. Thus, the optimum recording power varies in accordance with the wavelength variation of the laser beam emitted from the light emitting element. For this reason, recording quality for an optical disk also varies according to the wavelength variation of the laser beam.

By the way, the wavelength variation of the laser beam emitted from the light emitting element in recording is relatively drastic with respect to variation of environmental temperature. Consequently, when recording is performed at a different environmental temperature by using recording power that is optimum at a certain temperature, a case is conceived where the optimum recording power is not achieved even when the recording power with which the light emitting element performs emission is the same. Thus, there is concern that recording quality for an optical disk is degraded.

As for counter measures, conventionally, there is technology that maintains recording quality by setting again the recording power, pulse shape and the like (recording strategy), or performing test recording again when temperature in the vicinity of the optical disk apparatus having the light emitting element is measured, and the temperature in the vicinity of the optical disk apparatus changes to equal to or more than a predetermined temperature (refer to Japanese Laid-Open Patent Applications No. 2001-297437 and No. 2001-176141, for example).

In addition, there is conventional technology that detects the wavelength of the laser beam emitted from the light emitting element and drives the light emitting element according to the detected wavelength of the laser beam so as to correspond to the variation of the environmental temperature (refer to Japanese Laid-Open Patent Application No. 2001-297465, for example).

However, it is conceived that the relationship between the optimum recording power and the environmental temperature differs depending on variation of the optical disk apparatuses (especially, lasers), the kind of an optical disk, production lot, and the like. Accordingly, there is fear that the optimum recording power is not always obtained by obtaining a unique recording power from a temperature. As measures for this, it is preferable that the optimum recording power is obtained by performing the OPC every time real recording is performed.

On the other hand, it is highly possible that the PCA soon becomes full when the OPC is performed every time the environmental temperature varies, since the PCA is limited in an optical disk (Write Once medium) that includes the recording layer using organic dye and can be written to only once. When the PCA soon becomes full, test recording cannot be performed anymore. Accordingly, recording thereafter must be done without performing the OPC, though a normal real recording area still remains.

SUMMARY OF THE INVENTION

Accordingly, it is a general object of the present invention to provide an improved and useful optical disk apparatus, optical recording method, optical recording program and storage medium in which the above-mentioned problems are eliminated.

It is another and more specific object of the present invention to obtain optimum power according to wavelength variation of a laser beam caused by temperature variation without excessively increasing the number of times of test recording.

It is still another object of the present invention to obtain good recording quality irrespective of the number of times of recording to a single optical disk and environmental temperature variation when recording to the optical disk in which recording of information to the same location can be done only once, for example.

In order to achieve the above-mentioned objects, according to one aspect of the present invention, there is provided an optical disk apparatus, including: a light emitting element emitting a laser beam directed to a recordable optical disk; a driver rotating the optical disk; a first optimum recording power obtaining part performing test recording on the optical disk while the optical disk is rotated by the driver and output power of the light emitting element is varied so as to obtain an optimum recording power based on a reproduction signal in an area of the optical disk on which the test recording is performed; a temperature measuring part measuring a temperature in the vicinity of the light emitting element; a memory storing the optimum recording power obtained by the first optimum recording power obtaining part and a temperature measured by the temperature measuring part when the optimum recording power is obtained such that the optimum recording power is associated with the temperature; a temperature-dependent recording power obtaining part referring to the optimum recording power and the temperature associated with the optimum recording power that are stored in the memory so as to obtain an optimum recording power according to a temperature measured by the temperature measuring part in real recording; and a target recording power setting part setting the optimum recording power obtained by the temperature-dependent recording power obtaining part to a target recording power in the real recording.

According to the above-mentioned aspect of the present invention, in real recording, the optimum recording power according to the temperature measured by the temperature measuring part is set as the target recording power in real recording, by referring to the optimum recording power and the temperature associated with the optimum recording power that are stored in the memory. Thus, it is possible to set the target recording power according to an environmental temperature and to reduce the number of times of performing the test recording compared with a case where the test recording is performed every time real recording is performed. Accordingly, when recording to an optical disk (Write Once medium) that can record information only once, for example, it is possible to obtain a good recording quality without being influenced by the number of times of recording to the same optical disk and variation of the environmental temperature.

Also, the optical disk apparatus according to the present invention may further include an approximate expression obtaining part obtaining an approximate expression approximating variation of the optimum recording power according to temperature variation measured by the temperature measuring part based on the optimum recording power and the temperature associated with the optimum recording power that are stored in the memory, wherein the temperature-dependent recording power obtaining part obtains an optimum recording power corresponding to the temperature measured by the temperature measuring part in the real recording based on the approximate expression obtained by the approximate expression obtaining part.

Accordingly, in the optical disk apparatus, when performing real recording, in addition to the above-mentioned effect, it is possible to obtain the optimum recording power more accurately by calculation by setting the target recording power according to the approximate expression obtained based on the optimum recording power and the temperature associated with the optimum recording power that are stored in the memory and to the temperature measured by the temperature measuring part.

Additionally, the optical disk apparatus may further include a second optimum recording power obtaining part causing the first optimum recording power obtaining part to obtain an optimum recording power in the real recording; and a recording power selecting part selecting, as the target recording power in the real recording, one of the optimum recording power obtained by the second optimum recording power obtaining part and the optimum recording power obtained by the temperature-dependent recording power obtaining part, wherein the target recording power setting part sets the optimum recording power selected by the recording power selecting part as the target recording power in the real recording.

Accordingly, in the optical disk apparatus, according to a temperature measured in real recording or the size of a test recording area of an optical disk, for example, one of the optimum recording power obtained by the second optimum recording power obtaining part and the optimum recording power obtained by the temperature-dependent recording power obtaining part is appropriately set as the target recording power in real recording. Hence, it is possible to reduce the number of times of performing the test recording so as to control the consumption of a test recording area, or to prioritize the accuracy properly by setting the target recording power based on the optimum recording power obtained by calculation as needed.

Further, the optical disk apparatus may further include a range determining part determining whether the temperature measured by the temperature measuring part in the real recording falls within a specified temperature range based on a temperature stored in the memory, wherein the recording power selecting part selects, as the target recording power, the optimum recording power obtained by the second optimum recording power obtaining part, when the range determining part determines that the temperature measured by the temperature measuring part does not fall within the specified temperature range stored in the memory.

Accordingly, in real recording, when the temperature measured by the temperature measuring part does not fall within the specified temperature range based on the temperature stored in the memory, the optimum recording power obtained by the second optimum recording power obtaining part is set as the target recording power. Thus, the test recording is performed only when the measured temperature is greatly different from the temperature stored in the memory, such as when the amount of stored information in the memory is small. Therefore, it is possible to control an error in setting the target recording power even when the target recording power is set by selecting the optimum recording power from the memory. Hence, it is possible to better maintain the recording quality. Additionally, it is possible to enhance reference values for making decisions since the optimum recording power obtained by the second optimum recording power obtaining part and the measured temperature then are stored in the memory, and thus the amount of data in the memory is increased. Hence, it is possible to reduce the error between the target recording power set by selecting from the optimum recording power in the memory and the target recording power set based on the optimum recording power obtained by the second optimum recording power obtaining part.

In addition, in the optical disk apparatus, the memory may further store the optimum recording power obtained by the second optimum recording power obtaining part and the temperature measured by the temperature measuring part when obtaining the optimum recording power such that the optimum recording power is associated with the temperature, when the range determining part determines that the temperature measured by the temperature measuring part does not fall within the specified temperature range based on the temperature stored in the memory.

Accordingly, in real recording, when the range determining part determines that the temperature measured by the temperature measuring part does not fall in the specified temperature range based on the temperature stored in the memory, the optimum recording power obtained by the second optimum recording power obtaining part and the temperature measured by the temperature measuring part when obtaining the optimum recording power are further stored in the memory such that the optimum recording power is associated with the measured temperature. Thus, the amount of data stored in the memory is increased with the increase in the number of times of performing real recording. Hence, it is possible to improve the accuracy of the optimum recording power obtained by the temperature-dependent recording power obtaining part and to effectively reduce the number of times of performing test recording compared with a case where test recording is performed every time real recording is performed.

In addition, according to another aspect of the present invention, there is provided an optical recording method for an optical disk apparatus having a light emitting element emitting a laser beam directed to a recordable optical disk, a driver rotating the optical disk, and a temperature measuring part measuring a temperature in the vicinity of the light emitting element, the recording method including the steps of: a first optimum recording power obtaining step obtaining an optimum recording power based on a reproduction signal in an area of the optical disk on which a test recording is performed, the test recording being performed such that the optical disk is rotated by the driver and output power of the light emitting element is varied; storing, in a memory, the obtained optimum recording power and a temperature measured by the temperature measuring part when obtaining the optimum recording power, such that the obtained optimum recording power is associated with the measured temperature; obtaining an optimum recording power according to a temperature measured by the temperature measuring part in real recording by referring to the optimum recording power and the temperature associated with the optimum recording power that are stored in the memory; and setting, as a target recording power in the real recording, the optimum recording power obtained in the step of obtaining the optimum recording power according to the measured temperature.

According to the above-mentioned aspect of the present invention, in real recording, the optimum recording power according to the temperature measured by the temperature measuring part is set as the target recording power in real recording by referring to the optimum recording power and the temperature associated with the optimum recording power that are stored in the memory. Thus, it is possible to set the target recording power according to an environmental temperature and to reduce the number of times of performing test recording compared with a case where test recording is performed every time real recording is performed. Hence, even when recording to an optical disk (Write Once medium) capable of recording information only once to the same place, for example, it is possible to obtain a good recording quality without being influenced by the number of times of recording to the same optical disk and variation of the environmental temperature.

Furthermore, the optical recording method according to the present invention may further include the step of: obtaining an approximate expression approximating variation of the optimum recording power according to variation of the temperature measured by the temperature measuring part based on the optimum recording power and the temperature associated with the optimum recording power that are stored in the memory, wherein, in the step of obtaining the optimum recording power according to the measured temperature, an optimum recording power corresponding to the temperature measured by the temperature measuring part in the real recording is obtained based on the obtained approximate expression.

Accordingly, in real recording, the target recording power is set according to the approximate expression obtained based on the optimum recording power and the temperature associated with the optimum recording power that are stored in the memory and to the temperature measured by the temperature measuring part in real recording. Hence, in addition to the above-mentioned effect, it is possible to more accurately obtain the optimum recording power by calculation.

In addition, the optical recording method may further include the steps of: a second optimum recording power obtaining step obtaining the optimum recording power in the real recording in a manner similar to the first optimum recording power obtaining step; and selecting, as the target recording power in the real recording, one of the optimum recording power obtained in the second optimum recording power obtaining step, and the optimum recording power obtained in the step of obtaining the optimum recording power according to the measured temperature, wherein, in the step of setting the target recording power, the optimum recording power selected in the step of selecting the target recording power is set as the target recording power in the real recording.

Accordingly, in the optical recording method, according to a temperature measured in real recording or the size of a test recording area of an optical disk, for example, one of the optimum recording power obtained in the second optimum recording power obtaining step, and the optimum recording power obtained in the step of obtaining the optimum recording power according to the measured temperature is appropriately set as the target recording power in real recording. Hence, it is possible to reduce the number of times of performing test recording so as to control the consumption of the test recording area, or to prioritize the accuracy properly by setting the target recording power based on the optimum recording power obtained by calculation as needed.

Additionally, in the step of selecting the target recording power, when the temperature measured by the temperature measuring part does not fall within a specified temperature range based on the temperature stored in the memory, the optimum recording power obtained in the second optimum recording power obtaining step may be selected as the target recording power.

Accordingly, in real recording, when the temperature measured by the temperature measuring part does not fall within the specified temperature range based on the temperature stored in the memory, the optimum recording power obtained in the second optimum recording power obtaining step is set as the target recording power. Thus, the test recording is performed only when the measured temperature is greatly different from the temperature stored in the memory, such as when the amount of stored information in the memory is small. Therefore, it is possible to control an error in setting the target recording power even when the target recording power is set by selecting the optimum recording power from the memory. Hence, it is possible to better maintain the recording quality, in addition, it is possible to enhance reference values for making decisions since the optimum recording power obtained by the second optimum recording power obtaining part and the measured temperature then are stored in the memory, and thus the amount of data in the memory is increased. Hence, it is possible to reduce the error between the target recording power set by selecting from the optimum recording power in the memory and the target recording power set based on the optimum recording power obtained in the second optimum recording power obtaining step.

Further, when the temperature measured by the temperature measuring part does not fall within the specified temperature range based on the temperature stored in the memory, the optimum recording power obtained in the second optimum recording power obtaining step, and the temperature measured by the temperature measuring part when obtaining the optimum recording power may be further stored in the memory such that the optimum recording power is associated with the temperature.

Accordingly, in real recording, when the temperature measured by the temperature measuring part does not fall within the specified temperature range based on the temperature stored in the memory, the optimum recording power obtained in the second optimum recording power obtaining step and the temperature measured by the temperature measuring part when obtaining the optimum recording power may be further stored in the memory such that the optimum recording power is associated with the measured temperature. Hence, it is possible to improve the accuracy of the optimum recording power obtained in the step of obtaining the optimum recording power according to the measured temperature by increasing the amount of data stored in the memory with the increase in the number of times of performing real recording and to effectively reduce the number of times of performing test recording compared with a case where test recording is performed every time real recording is performed.

In addition, according to another aspect of the present invention, there is provided an optical recording program interpreted by a computer of an optical disk apparatus having a light emitting element emitting a laser beam directed to a recordable optical disk, a driver rotating the optical disk, and a temperature measuring part measuring a temperature in the vicinity of the light emitting element, the optical recording program including the instructions of: causing the computer to obtain an optimum recording power based on a reproduction signal in an area of the optical disk on which test recording is performed, the test recording being performed such that the optical disk is rotated by the driver and output power of the light emitting element is varied; causing the computer to store, in a memory, the obtained optimum recording power and a temperature measured by the temperature measuring part when obtaining the optimum recording power such that the obtained optimum recording power is associated with the measured temperature; causing the computer to obtain an optimum recording power according to a temperature measured by the temperature measuring part in real recording by referring to the optimum recording power and the temperature associated with the optimum recording power that are stored in the memory; and causing the computer to set, as a target recording power in the real recording, the optimum recording power obtained from the optimum recording power stored in the memory.

According to the above-mentioned aspect of the present invention, in real recording, the optimum recording power according to the temperature measured by the temperature measuring part is set as the target recording power in real recording, by referring to the optimum recording power and the temperature associated with the optimum recording power that are stored in the memory. Thus, it is possible to set the target recording power according to an environmental temperature and to reduce the number of times of performing the test recording compared with a case where the test recording is performed every time real recording is performed. Accordingly, when recording to an optical disk (Write Once medium) that can record information only once to the same place, for example, it is possible to obtain a good recording quality without being influenced by the number of times of recording to the same optical disk and variation of the environmental temperature.

Additionally, the optical recording program according to the above-mentioned aspect of the present invention may further include the instruction of: causing the computer to obtain an approximate expression approximating variation of the optimum recording power according to variation of the temperature measured by the temperature measuring part based on the optimum recording power and the temperature associated with the optimum recording power that are stored in the memory, wherein, as the instruction of causing the computer to obtain the optimum recording power according to the measured temperature, an optimum recording power corresponding to the temperature measured by the temperature measuring part in the real recording is obtained based on the obtained approximate expression.

Accordingly, in real recording, in addition to the above-mentioned effect, it is possible to obtain the optimum recording power more accurately by calculation by setting the target recording power according to the approximate expression obtained based on the optimum recording power and the temperature associated with the optimum recording power that are stored in the memory and to the temperature measured by the temperature measuring part.

Further, the optical recording program may further include the instructions of: causing the computer to obtain, in the real recording, the optimum recording power from the reproduction signal in the area of the optical disk on which the test recording is performed; and causing the computer to select, as the target recording power in the real recording, one of the optimum recording power obtained from the reproduction signal of the area on which the test recording is performed, and the optimum recording power obtained from the optimum recording power stored in the memory, wherein, as for the instruction causing the computer to set the target recording power, the selected optimum recording power is set as the target recording power in the real recording.

Accordingly, according to a temperature measured in real recording or the size of a test recording area of an optical disk, for example, one of the optimum recording power obtained from the reproduction signal in the area on which the test recording is performed and the optimum recording power obtained from the optimum recording power stored in the memory is appropriately set as the target recording power in real recording. Hence, it is possible to reduce the number of times of performing the test recording so as to control the consumption of the test recording area, or to prioritize the accuracy properly by setting the target recording power based on the optimum recording power obtained by calculation as needed.

In addition, the optical recording program may further include the instruction of: causing the computer to determine, in the real recording, whether the temperature measured by the temperature measuring part falls within a specified temperature range based on the temperature stored in the memory, wherein, as the instruction of causing the computer to select the target recording power, when it is determined that the temperature measured by the temperature measuring part does not fall within the specified temperature range based on the temperature stored in the memory, the computer is caused to select the optimum recording power obtained from the reproduction signal of the area on which the test recording is performed in the real recording as the target recording power.

Accordingly, in real recording, when the temperature measured by the temperature measuring part does not fall within the specified temperature range based on the temperature stored in the memory, the optimum recording power obtained from the reproduction signal of the area on which the test recording is performed is set as the target recording power. Thus, the test recording is performed only when the measured temperature is greatly different from the temperature stored in the memory, such as when the amount of stored information in the memory is small. Therefore, it is possible to control an error in setting the target recording power even when the target recording power is set by selecting the optimum recording power from the memory. Hence, it is possible to better maintain the recording quality. Additionally, it is possible to enhance reference values for making decisions since the optimum recording power obtained from the reproduction signal of the area on which the test recording is performed and the measured temperature then are stored in the memory, and thus the amount of data in the memory is increased. Hence, it is possible to reduce the error between the target recording power set by selecting the optimum recording power from the memory and the target recording power set based on the optimum recording power obtained from the reproduction signal of the area on which the test recording is performed when performing real recording.

Additionally, in the optical recording program, as the instruction of causing the computer to store the optimum recording power and the temperature in the memory, when it is determined that the temperature measured by the temperature measuring part does not fall within the specified temperature range based on the temperature stored in the memory, the computer may be caused to further store, the optimum recording power obtained from the reproduction signal of the area on which the test recording is performed in the real recording and the temperature measured by the temperature measuring part when obtaining the optimum recording power such that the optimum recording power is associated with the measured temperature.

Accordingly, in the real recording, when it is determined that the temperature measured by the temperature measuring part does not fall within the specified temperature range based on the temperature stored in the memory, the optimum recording power obtained from the reproduction signal of the area on which the test recording is performed when performing the real recording, and the temperature measured by the temperature measuring part when obtaining the optimum recording power are further stored in the memory such that the optimum recording power is associated with the measured temperature. Hence, it is possible to improve the accuracy of the optimum recording power obtained when causing the computer to obtain the optimum recording power according to the measured temperature by increasing the amount of data stored in the memory with the increase of the number of times of performing the real recording. Also, it is possible to effectively reduce the number of times of performing the test recording compared with a case where the test recording is performed every time the real recording is performed.

In addition, according to another aspect of the present invention, there is provided a processor-readable storage medium storing the above-mentioned optical recording program.

According to the above-mentioned aspect of the present invention, in the real recording, the optimum recording power according to the temperature measured by the temperature measuring part is set as the target recording power in real recording, by referring to the optimum recording power and the temperature associated with the optimum recording power that are stored in the memory. Thus, it is possible to set the target recording power according to an environmental temperature and to reduce the number of times of performing the test recording compared with a case where the test recording is performed every time the real recording is performed. Accordingly, when recording to an optical disk (Write Once medium) that can record information only once to the same place, for example, it is possible to obtain a good recording quality without being influenced by the number of times of recording to the same optical disk and variation of the environmental temperature.

Other objects, features and advantages of the present invention will become more apparent from the following detailed description when read in conjunction with the following drawings.

DETAILED DESCRIPTION OF THE PREFERRED EMBODIMENTS

A description will be given of a first embodiment of the present invention, with reference to FIGS. 1 though 4. In this embodiment, an example is shown where the present invention is applied to an optical disk apparatus.

Figure 1:
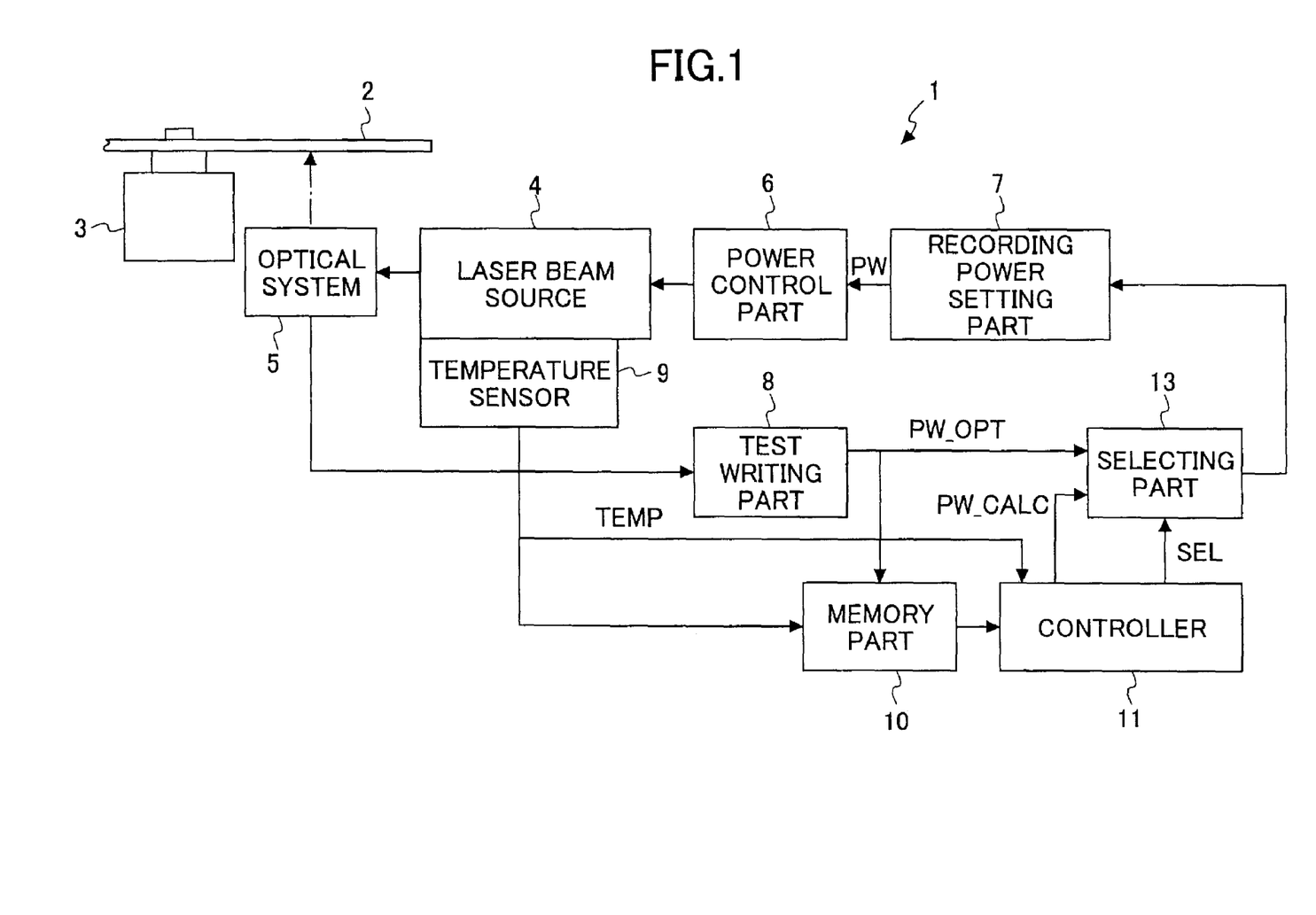
FIG. 1 is a block diagram for generally explaining an optical disk apparatus according to a first embodiment of the present invention.

FIG. 1 is a block diagram schematically showing an optical disk apparatus according to this embodiment. The optical disk apparatus 1 of this embodiment records to and reproduces from a writable optical disk 2 such as a CD-R, DVD-R, DVD+R and the like.

The optical disk apparatus 1 includes a rotating motor 3 as a driving means rotating the optical disk 2 and a laser beam source 4 as a light emitting element emitting a laser beam. The laser beam emitted from the laser beam source 4 is focused onto the optical disk 2 by an optical system 5.

The optical system 5 is formed by, for example, a collimate lens collimating the laser beam emitted from the laser beam source 4, a beam splitter deflecting and separating the laser beam collimated by the collimate lens, an objective lens focusing the laser beam that goes through the beam splitter to the optical disk 2, though the illustration and description thereof is omitted since such construction is a well known art. The laser beam source 4 and the optical system 5 of this embodiment are arranged on an optical head (not shown) called a pickup, and can move to an arbitrary position opposing the optical disk 2.

It should be noted that the laser beam source 4 emitting the laser beam is used in this embodiment, however, it is not a limitation.

Output power of the laser beam emitted from the laser beam source 4 is controlled by a power control part 6 as a power controlling means. Though not shown, the power control part 6 includes a monitor monitoring the amount of light emitted from the laser beam source 4, and a comparing part comparing the amount of light monitored by the monitor with the amount of light emitted at a predetermined recording power. The power control part 6 controls a driving current for the laser beam source 4 so that the amount of light monitored by the monitor matches the amount of light based on a set output power level, when performing a target recording power setting process, which will be described later, and real recording. For example, in real recording, the power control part 6 performs the control such that the laser beam is emitted with an output power of a target recording power Pw that is set by a recording power setting part 7 as a recording power setting means and set by performing a target recording power setting process, which will be described later. When carrying out the target recording power setting process, the controller 6 performs the control such that the laser beam is emitted with a predetermined output power that is set by a test recording part 8 as a test recording means.

Regarding the monitoring of the amount of light and the comparing control of the power control part 6, a description thereof is omitted since they are well-known art.

The test recording part 8 performs test recording of test data by driving the laser beam source 4 via the power control part 6, and emitting, to a predetermined area on the optical disk 2, the laser beam of which output power is sequentially varied. Then, the test recording part 8 reproduces the test data that are written by performing the test recording, and obtains, as an optimum recording power Pw_opt, a recording power with which the best reproducing state is achieved (hereinafter, the process is called OPC (Optimum Power Control)). Here, a first optimum recording power obtaining means and a first optimum recording power obtaining function are achieved. In addition, a first optimum recording power obtaining step is achieved. Generally, the OPC is performed prior to real recording of data to the optical disk 2. In addition, the OPC for an optical disk that can be recorded to only once is performed such that test recording is performed on a PCA (Power Calibration Area) that is secured (reserved) in the optical disk 2 in advance. The optimum recording power Pw_opt obtained by performing the OPC using the test recording part 8 is stored in a temperature-vs-power table 12 (refer to FIG. 2) stored in a memory 10. In addition, the thus obtained optimum recording power Pw_opt is used for making selection by a selecting part 13 as a recording power selecting means.

The recording power setting part 7 as a target recording power setting means sets, to the power control part 6, the target recording power Pw for real recording selected by the selecting part 13. The recording power setting part 7 sets the optimum recording power selected by the selecting part 13 as the target recording power Pw.

The selecting part 13 selects whether to set the optimum recording power Pw_opt obtained as a result of the OPC performed by the test recording part 8 as the target recording power Pw, or to set, as the target recording power Pw, an optimum recording power Pw_calc obtained by approximation using a controller 11 based on the data stored in the temperature-vs-power table 12 stored in the memory 10. Here, a recording power selecting function and a step of selecting a target recording power are achieved.

The selecting part 13 of this embodiment is set to make selection such that the OPC is performed when a measured temperature is outside a specified range, while the OPC is not performed, and instead the optimum recording power Pw_cal is obtained by approximation, when the measured temperature is within the specified range.

For example, as the target recording power setting process that will be described later, the selecting part 13 may be set to make selection such that the optimum recording power Pw_opt is obtained by performing the OPC with respect to a measured temperature that does not fall within a "specified temperature range" (that will be described later) that is appropriately varied in accordance with the measured temperature, while the optimum recording power Pw_calc is obtained by approximation without performing the OPC when the measured temperature falls within the specified temperature range. In addition, the selecting part 13 may be set to make selection such that the optimum recording power Pw_calc is obtained by approximation with respect to the measured temperature within a predetermined temperature range.

A temperature sensor 9 as a temperature measuring means is mounted in the vicinity of the laser beam source 4. It is preferable that the temperature sensor 9 be arranged to a position where the temperature of the laser beam source 4 can be measured so that wavelength variation of the laser beam is reflected. The temperature measuring result measured by the temperature sensor 9 is stored in the memory 10 and used for evaluation by the controller 11 in the target recording power setting process that will be described later.

Figure 2:
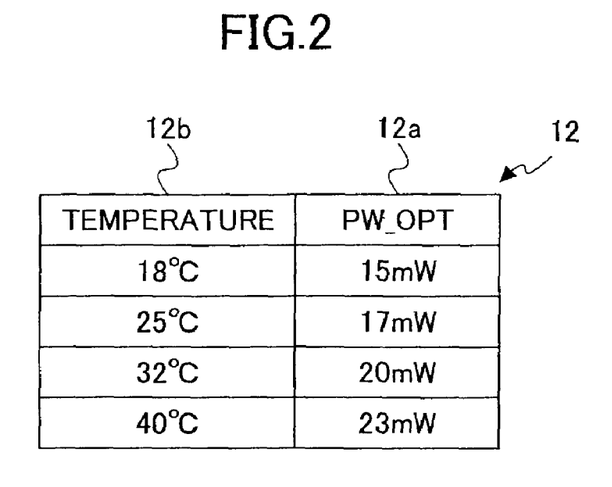
FIG. 2 is a table showing the data structure of a temperature-vs-power table.

The memory 10 stores the temperature-vs-power table 12 (refer to FIG. 2) that stores the optimum recording power Pw_opt obtained in the OPC and the measured temperature then such that the optimum recording power Pw_opt is associated with the measured temperature then. As shown in FIG. 2, in the temperature-vs-power table 12, an area 12*a* storing the optimum recording power Pw_opt obtained by OPC and an area 12*b* storing the temperature corresponding to each optimum recording power Pw_opt are secured. It should be noted that, in this embodiment, the number of pair data, the optimum recording power Pw_opt and the temperature associated with the optimum recording power Pw_opt, in the temperature-vs-power table 12 is limited to four.

The controller 11 determines whether to store data in the memory 10, evaluate the value of the data, perform approximate calculation or the OPC, and the like, and performs processes thereof. The controller 11 includes a microcomputer constituted by a CPU (Central Processing Unit), a ROM (Read Only Memory), a RAM (Random Access Memory), and the like. The controller 11 carries out various processes such as the target recording power setting process (that will be described later) based on a control program stored in the ROM and RAM. The ROM according to this embodiment stores an optical recording program for carrying out the target recording power setting process that will be describer later. Consequently, in this embodiment, a storage medium is achieved by the ROM.

It should be noted that, the storage medium is achieved by the ROM storing the optical recording program in this embodiment, however, this is not a limitation. The optical recording program may be stored in the RAM. In addition, the optical recording program may be stored in a portable storage medium such as a CD-ROM (Compact Disk ROM) or a CD-R/RW (Recordable/ReWritable). When the optical recording program is stored in a portable storage medium, it is possible to perform the target recording power setting process (that will be described later) by reading (installing included) the optical recording program.

Figure 4:
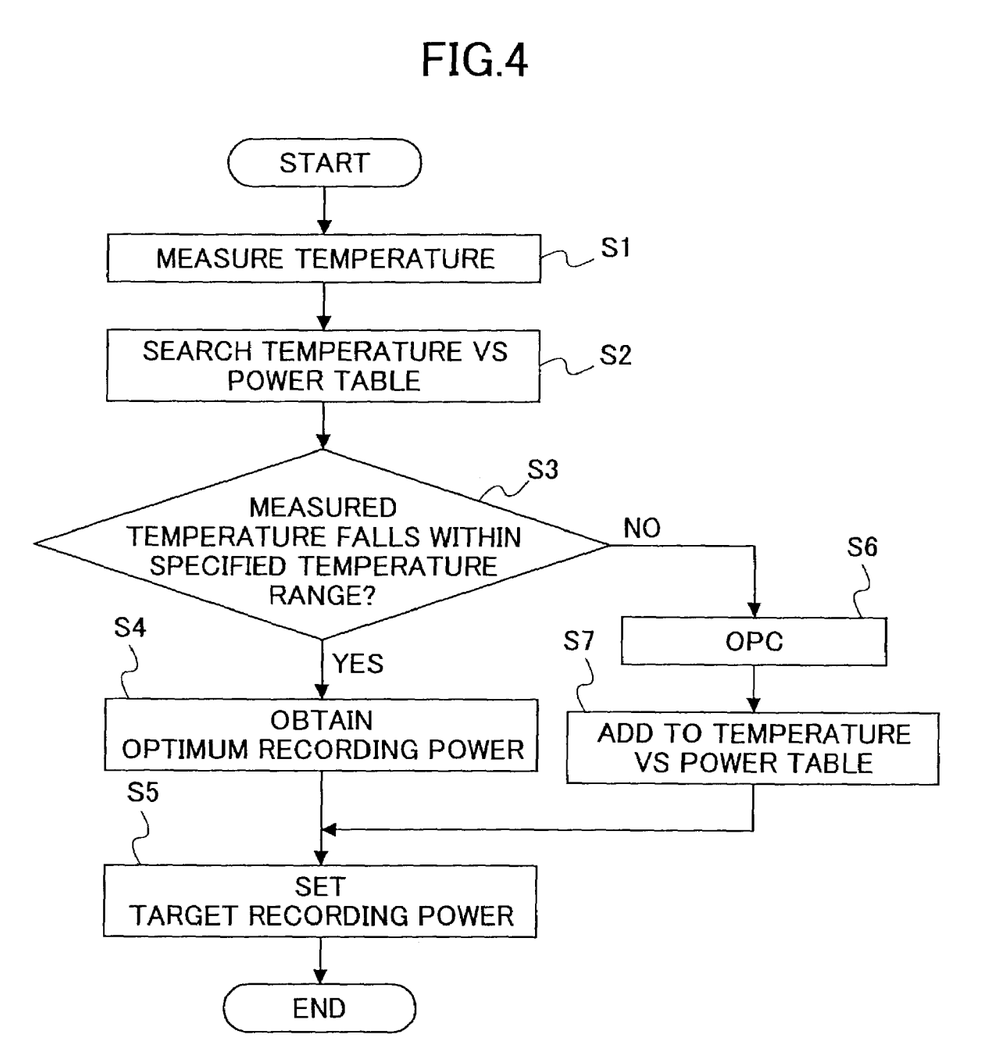
FIG. 4 is a flow chart for generally explaining a target recording power setting process.

Next, a description will be given of the target recording power setting process performed by the optical disk apparatus 1, with reference to FIG. 4. FIG. 4 is a flow chart for generally explaining the target recording power setting process performed by the controller 11. The target recording power setting process is performed when a recording execution declaring means (not shown) that the optical disk apparatus 1 includes declares execution of real recording.

In the target recording power setting process, first, an environmental temperature measured by the temperature sensor 9 is obtained in step S1.

The temperature-vs-power table 12 is searched in step S2, and in step S3, it is determined whether or not the measured environmental temperature is included in a specified temperature range that is a temperature range based on the environmental temperature in the temperature-vs-power table 12. In step S3, the function as a range determining means is performed.

In this embodiment, the "specified temperature range" refers to the range from the temperature that is 5° C. lower than the obtained temperature to the temperature that is 5° C. higher than the obtained temperature. For example, in a case where a plurality of environmental temperatures are stored in the temperature-vs-power table 12 by obtaining the temperatures for a plurality of times, the "specified temperature range" is the range from the temperature that is 5° C. lower than the lowest temperature in the temperature-vs-power table 12 to the temperature that is 5° C. higher than the highest temperature in the temperature-vs-power table 12.

For example, in the temperature-vs-power table 12 shown in FIG. 2, the temperature range is from 18° C. to 40° C. Thus, the "specified temperature range" in this embodiment is from 13° C. to 45° C. Then, in step S2, it is determined whether or not the obtained environmental temperature is included in the range from 13° C. to 45° C. For example, when an obtained current temperature is 12° C., the temperature is not included in the "specified temperature range". When an obtained current temperature is 13° C., the temperature is included in the "specified temperature range".

When it is determined that the obtained environmental temperature is included in the specified temperature range (YES in step S3), in step S4, the optimum recording power Pw_opt is obtained by calculation based on an approximate expression obtained from the temperature-vs-power table 12 and a current temperature measured by the temperature sensor 9. Then, in step S5, the obtained optimum recording power Pw_opt is set, as the target recording power Pw, to the recording power setting part 7. In step S4, a temperature-dependent recording power obtaining means and a temperature-dependent recording power obtaining function are achieved. Also, in step S5, a target recording power setting means and a target recording power obtaining function are achieved. Additionally, step S4 achieves a step of obtaining optimum recording power according to a measured temperature, and step S5 achieves a step of setting the target recording power.

In a case where the optimum recording power Pw_opt in the temperature-vs-power table 12 is taken on the vertical axis and the temperature is taken on the horizontal axis, when there are two or more coordinates each of which is specified to a point by the optimum recording power Pw_opt and the temperature, based on each of the coordinates, it is possible to express the variation of the target recording power Pw with respect to the variation of the environmental temperature with a mathematical formula by approximation. Here, an approximate expression obtaining means and an approximate expression obtaining function are achieved. In addition, here, a step of obtaining an approximate expression is achieved. Theoretically, it is possible to obtain the approximate expression when there are two or more coordinates expressed by the optimum recording power Pw_opt obtained by calculation and the temperature then in the temperature-vs-power table 12. Of course, regarding the approximate expression based on two or more coordinates, the greater the number of coordinates determined by the temperature and the optical recording power Pw_opt obtained by OPC, the further the error in approximation is reduced when making a graph of the optimum recording power Pw_opt obtained by calculation as a result of the target recording power setting process that will be described later and the measured temperature then. Accordingly, it is possible to provide high reliability.

On the other hand, in a case where the number of coordinates is excessively large, the number of times of performing the OPC in the target recording power setting process that will be described later is increased. Thus, time for the process is required. However, in this embodiment, since the number of coordinates in the temperature-vs-power table 12 in the memory 10 is limited to four pairs, it is possible to control the number of times of performing the OPC. Hence, it is possible to set the target recording power Pw without excessively performing the OPC, and also to achieve the trade-off between the memory size and the size of the PCA.

Figure 3:
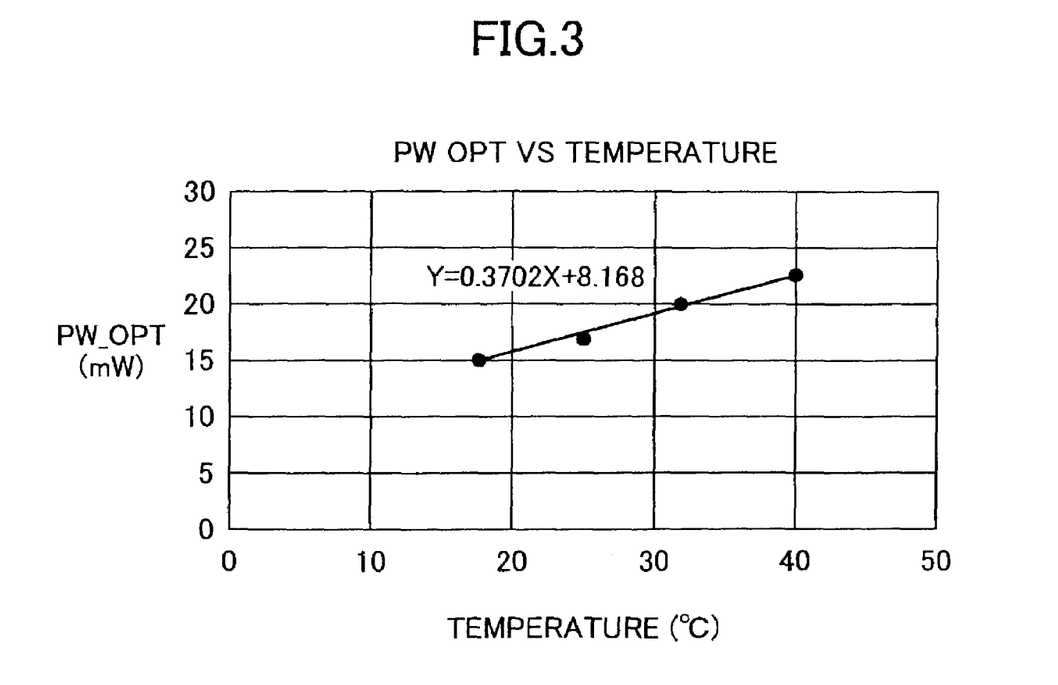
FIG. 3 is a graph showing an approximate expression obtained based on measured temperature and optimum recording power.

In this embodiment, by performing linear approximation based on four pairs of data obtained from the temperature-vs-power table 12 shown in FIG. 2, an equation (1) shown below is obtained, and the optimum recording power Pw_opt is obtained by performing the calculation of the equation (1). FIG. 3 is a correlation diagram showing the graph of the approximate expression obtained by approximation based on the coordinates shown in the temperature-vs-power table 12 shown in FIG. 2. In this embodiment, a linear graph is obtained by approximation. However, a graph made by the approximate expression obtained based on the temperature-vs-power table 12 may have a curved shape.

$$Pw\_opt=0.3702 \times temp+8.168 [mW] \quad (1)$$

By performing the calculation shown in the equation (1) based on the obtained temperature, it is possible to obtain the optimum recording power Pw_opt at an arbitrary temperature (within the range) by calculation.

For example, when an obtained current temperature is 13° C., by performing the above-described linear approximation shown in the equation (1) using the temperature-vs-power table 12 shown in FIG. 2, it is possible to obtain the optimum recording power Pw_opt as shown in a following equation (1)'.

$$Pw\_opt=0.3702 \times 13+8.168=12.98 [mW] \quad (1)'$$

In this manner, by performing the target recording power setting process that is started in a case where the execution of real recording is declared by the recording execution declaring part, when the environmental temperature measured in real recording falls within the specified temperature range based on the temperature-vs-power table 12, it is possible to obtain the optimum recording power Pw_calc by the calculation based on the approximate expression without performing the OPC, and to set the obtained optimum recording power Pw_opt as the target recording power Pw. Therefore, it is not necessary to perform the OPC with respect to the temperature of which optimum recording power Pw_calc is already obtained.

Hence, it is possible to obtain the target recording power Pw according to the environmental temperature, while controlling the use of the PCA by reducing the number of times of performing the OPC.

Additionally, in this embodiment, in a case where the environmental temperature measured in real recording is in the "specified temperature range", even when the measured environmental temperature is outside the temperature range that is actually measured, the optimum recording power Pw_calc, that is, the target recording power Pw, is obtained based on the approximate expression. Hence, in the predetermined range, by obtaining the target recording power Pw by extrapolation using the approximate expression obtained by the calculation, even when a measured current environmental temperature is outside the temperature range that is already stored in the temperature-vs-power table 12 in the memory 10, it is possible to control the consumption of the PCA while controlling the number of times of performing the OPC so that the OPC is not excessively performed.

At this moment, by setting an appropriate "specified temperature range", it is possible to prevent the target recording power Pw from being greatly shifted from the real optimum recording power Pw_opt obtained by the OPC.

Further, it is possible to increase the temperature range by adding and storing, to the temperature-vs-power table 12, a measured temperature and the optimum recording power obtained by the OPC performed when the measured temperature is excessively different from the "specified temperature range".

On the other hand, when it is determined that the obtained environmental temperature does not fall within the "specified temperature range" based on the environmental temperatures that are already stored (NO in step S3), test recording is performed on the PCA of the optical disk 2 by the test recording part 8 with predetermined test recording power. Then, based on a reproduction signal from the PCA on which the test recording is performed, the OPC for obtaining the optimum recording power Pw_opt is performed in step S6. Hence, a second optimum recording power obtaining means and a second optimum recording power obtaining function are achieved. In addition, a second optimum recording power obtaining step is achieved.

In step S7, the obtained optimum recording power Pw_opt and the environmental temperature that is measured by the temperature sensor 9 when the optimum recording power is obtained are further stored in the temperature-vs-power table 12 such that the optimum recording power Pw_opt is associated with the measured environmental temperature. Thereafter, the process proceeds to step S5.

The temperature-vs-power table 12 of this embodiment is controlled to store up to four pairs of data. Thus, based on the table, it is possible to perform appropriate linear or curvilinear approximation with little error and to limit the number of times of performing the OPC. These are the tradeoffs between the memory size and the size of the PCA.

By the way, when recording is performed on the optical disk 2 for the first time, the temperature-vs-power table 12 in the memory 10 stores nothing. In this case, in step S3, it is determined that the obtained environmental temperature does not fall within the "specified temperature range" (NO in step S3), the OPC is performed, and the optimum recording power Pw_opt obtained then is set, as the target recording power Pw, to the recording power setting part 7. Additionally, the environmental temperature then is measured at the same time and stored in the temperature-vs-power table 12 in the memory 10 such that the environmental temperature is associated with the obtained optimum recording power Pw_opt.

Further, every time the target recording power setting process as explained in FIG. 4 is performed, the number of the coordinates in the temperature-vs-power table 12 in the memory 10 is increased. By obtaining the target recording power Pw based on a lot of coordinates, even when the target recording power Pw is obtained based on a measured current temperature and the approximate expression, it is possible to reduce an error in the obtained target recording power Pw. It is possible to provide a more easy-to-use optical disk apparatus by appropriately setting the upper limit of the number of coordinates in the temperature-vs-power table 12 based on the accuracy of the optimum recording power Pw_opt obtained by calculation, the number of times of performing the OPC, and the like.

It should be noted that, in this embodiment, the number of pairs of the optimum recording power Pw_opt and the environmental temperature in the temperature-vs-power table 12 is set up to four, however, this is not a limitation.

Next, a description will be given of a second embodiment of the present invention, with reference to FIG. 5. In this embodiment, the present invention is applied to an optical disk apparatus. It should be noted that in the second embodiment, those parts that are the same as those corresponding parts in the first embodiment are designated by the same reference numerals, and a description thereof will be omitted.

Figure 5:
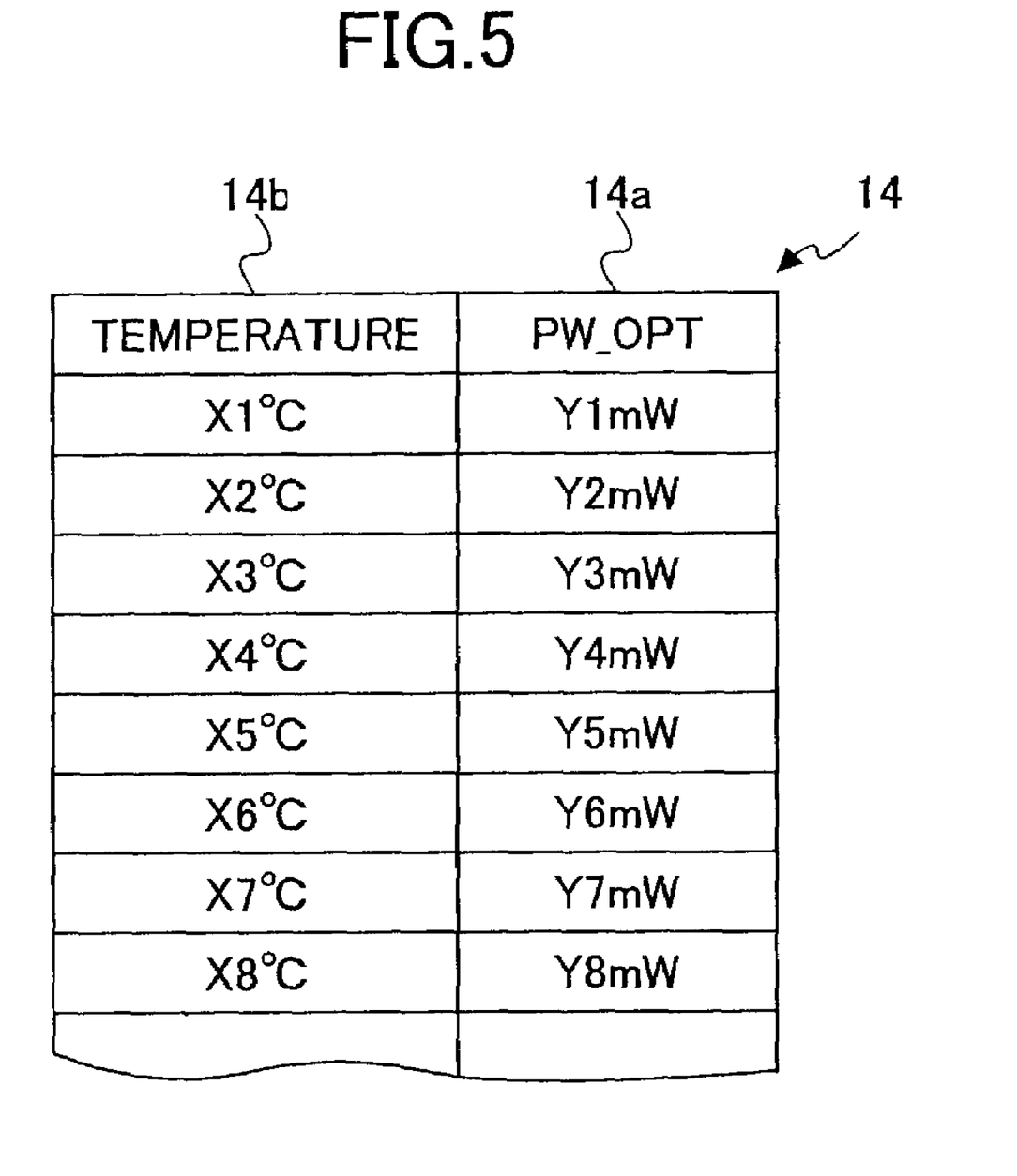
FIG. 5 is a table showing the data structure of a temperature-vs-power table according to a second embodiment of the present invention.

FIG. 5 is a table showing the data structure of a temperature-vs-power table according to this embodiment. As can be seen from FIG. 5, in the temperature-vs-power table 14 of this embodiment, an area 14a storing the optimum recording power Pw_opt obtained by OPC and an area 14b storing the temperatures associated with each optimum recording power Pw_opt are secured.

In this embodiment, in the target recording power setting process, in a case where the obtained environmental temperature does not fall within the "specified temperature range" based on the environmental temperatures that are already stored, when the target recording power is obtained from the optimum recording power Pw_opt obtained by performing the OPC, pair data of the optimum recording power Pw_opt then and the corresponding temperature are further stored in the temperature-vs-power table 14.

Hence, the pair data are stored in the temperature-vs-power table 14 in a cumulative manner every time the optimum recording power Pw_opt is obtained by OPC.

Therefore, with the increase of the number of times of real recording, the amount of the data in the temperature-vs-power table 14 is increased. Accordingly, in the target recording power setting process, it is possible to improve the accuracy of the target recording power Pw that is set and obtained from the optimum recording power Pw_opt stored in the temperature-vs-power table 14.

In addition, with the increase of the number of times of real recording, the amount of the data in the temperature-vs-power table 14 is increased. Accordingly, it is possible to reduce the number of times of performing the OPC compared with the case where the OPC is performed every time real recording is performed.

The present invention is not limited to the specifically disclosed embodiments, and variations and modifications may be made without departing from the scope of the present invention.

The present application is based on Japanese priority applications No. 2002-044286 filed on Feb. 21, 2002, and No. 2002-285312 filed on Sep. 30, 2002, the entire contents of which are hereby incorporated by reference.

What is claimed is:

1. An optical disk apparatus comprising:
a light emitting element emitting a laser beam directed to a recordable optical disk;
a driver rotating the optical disk;
a first optimum recording power obtaining part performing a test recording on the optical disk while the optical disk is rotated by the driver and output power of the light emitting element is varied so as to obtain an optimum recording power based on a reproduction signal in an area of the optical disk on which the test recording is performed;

a temperature measuring part measuring a temperature in the vicinity of the light emitting element;

a memory storing the optimum recording power obtained by the first optimum recording power obtaining part and the temperature measured by the temperature measuring part when the optimum recording power is obtained such that the optimum recording power is associated with the temperature;

a temperature-dependent recording power obtaining part referring to the optimum recording power and the temperature associated with the optimum recording power that are stored in the memory so as to obtain the optimum recording power according to the temperature measured by the temperature measuring part in real recording;

a target recording power setting part setting the optimum recording power obtained by the temperature-dependent recording power obtaining part to a target recording power in the real recording;

a second optimum recording power obtaining part causing the first optimum recording power obtaining part to obtain the optimum recording power in the real recording; and a recording power selecting part selecting, as the target recording power in the real recording, one of the optimum recording power obtained by the second optimum recording power obtaining part and the optimum recording power obtained by the temperature-dependent recording power obtaining part, wherein the target recording power setting part sets the optimum recording power selected by the recording power selecting part as the target recording power in the real recording.

2. The optical disk apparatus as claimed in claim 1, further comprising:

an approximate expression obtaining part obtaining an approximate expression approximating variation of the optimum recording power according to temperature variation measured by the temperature measuring part based on the optimum recording power and the temperature associated with the optimum recording power that are stored in the memory, wherein the temperature-dependent recording power obtaining part obtains the optimum recording power corresponding to the temperature measured by the temperature measuring part in the real recording based on the approximate expression obtained by the approximate expression obtaining part.

3. The optical disk apparatus as claimed in claim 1, further comprising:

a range determining part determining whether the temperature measured by the temperature measuring part in the real recording falls within a specified temperature range based on the temperature stored in the memory, wherein the recording power selecting part selects, as the target recording power, the optimum recording power obtained by the second optimum recording power obtaining part, when the range determining part determines that the temperature measured by the temperature measuring part does not fall within the specified temperature range based on the temperature stored in the memory.

4. The optical disk apparatus as claimed in claim 3, wherein the memory further stores the optimum recording power obtained by the second optimum recording power obtaining part and the temperature measured by the temperature measuring part when obtaining the optimum recording power such that the optimum recording power is associated with the temperature, when the range determining part determines that the temperature measured by the temperature measuring part does not fall within the specified temperature range based on the temperature stored in the memory.

5. An optical recording method for an optical disk apparatus having a light emitting element emitting a laser beam directed to a recordable optical disk, a driver rotating the optical disk, and a temperature measuring part measuring a temperature in the vicinity of the light emitting element, the recording method comprising the steps of:

a first optimum recording power obtaining step obtaining an optimum recording power based on a reproduction signal in an area of the optical disk on which a test recording is performed, the test recording being performed such that the optical disk is rotated by the driver and output power of the light emitting element is varied;

storing, in a memory, the obtained optimum recording power and the temperature measured by the temperature measuring part when obtaining the optimum recording power, such that the obtained optimum recording power is associated with the measured temperature;

obtaining the optimum recording power according to the temperature measured by the temperature measuring part in real recording by referring to the optimum recording power and the temperature associated with the optimum recording power that are stored in the memory;

setting as a target recording power in the real recording, the optimum recording power obtained in the step of obtaining the optimum recording power according to the measured temperature;

a second optimum recording power obtaining step obtaining the optimum recording power in the real recording in a manner similar to the first optimum recording power obtaining step; and selecting, as the target recording power in the real recording, one of the optimum recording power obtained in the second optimum recording power obtaining step, and the optimum recording power obtained in the step of obtaining the optimum recording power according to the measured temperature, wherein, in the step of setting the target recording power, the optimum recording power selected in the step of selecting the target recording power is set as the target recording power in the real recording.

6. The optical recording method as claimed in claim 5, further comprising the step of:

obtaining an approximate expression approximating variation of the optimum recording power according to variation of the temperature measured by the temperature measuring part based on the optimum recording power and the temperature associated with the optimum recording power that are stored in the memory, wherein, in the step of obtaining the optimum recording power according to the measured temperature, the optimum recording power corresponding to the temperature measured by the temperature measuring part in the real recording is obtained based on the obtained approximate expression.

7. The optical recording method as claimed in claim 5, wherein, in the step of selecting the target recording power, when the temperature measured by the temperature measuring part does not fall within a specified temperature range based on the temperature stored in the memory, the optimum recording power obtained in the second optimum recording power obtaining step is selected as the target recording power.

8. The optical recording method as claimed in claim 7, wherein, when the temperature measured by the temperature measuring part does not fall within the specified temperature range based on the temperature stored in the memory, the optimum recording power obtained in the second optimum recording power obtaining step, and the temperature measured by the temperature measuring part when obtaining the optimum recording power are further stored in the memory such that the optimum recording power is associated with the temperature.

9. An optical recording program stored on a computer readable media that is executed by a computer of an optical disk apparatus having a light emitting element emitting a laser beam directed to a recordable optical disk, a driver rotating the optical disk, and a temperature measuring part measuring a temperature in the vicinity of the light emitting element, said optical recording program comprising the instructions of:

causing the computer to obtain an optimum recording power based on a reproduction signal in an area of the optical disk on which a test recording is performed, the test recording being performed such that the optical disk is rotated by the driver and output power of the light emitting element is varied;

causing the computer to store, in a memory, the obtained optimum recording power and the temperature measured by the temperature measuring part when obtaining the optimum recording power, such that the obtained optimum recording power is associated with the measured temperature;

causing the computer to obtain the optimum recording power according to the temperature measured by the temperature measuring part in real recording by referring to the optimum recording power and the temperature associated with the optimum recording power that are stored in the memory;

causing the computer to set, as a target recording power in the real recording, the optimum recording power obtained from the optimum recording power stored in the memory;

causing the computer to obtain, in the real recording, the optimum recording power from the reproduction signal in the area of the optical disk on which the test recording is performed; and causing the computer to select, as the target recording power in the real recording, one of the optimum recording power obtained from the reproduction signal of the area of the optical disk on which the test recording is performed in the real recording, and the optimum recording power obtained from the optimum recording power stored in the memory, wherein, as for the instruction of causing the computer to set the target recording power, the selected optimum recording power is set as the target recording power in the real recording.

10. The optical recording program stored on a computer readable media as claimed in claim 9, further comprising the instruction of:

causing the computer to obtain an approximate expression approximating variation of the optimum recording power according to variation of the temperature measured by the temperature measuring part based on the optimum recording power and the temperature associated with the optimum recording power that are stored in the memory, wherein, as for the instruction of causing the computer to obtain the optimum recording power according to the measured temperature, the optimum recording power corresponding to the temperature measured by the temperature measuring part in the real recording is obtained based on the obtained approximate expression.

11. The optical recording program stored on a computer readable media as claimed in claim 9, further comprising the instruction of:

causing the computer to determine, in the real recording, whether the temperature measured by the temperature measuring part falls within a specified temperature range based on the temperature stored in the memory, wherein, as for the instruction of causing the computer to select the target recording power, when it is determined that the temperature measured by the temperature measuring part does not fall within the specified temperature range based on the temperature stored in the memory, the computer is caused to select the optimum recording power obtained from the reproduction signal of the area of the optical disk on which the test recording is performed in the real recording as the target recording power.

12. The optical recording program stored on a computer readable media as claimed in claim 11, wherein, as the instruction of causing the computer to store the optimum recording power and the temperature in the memory, when it is determined that the temperature measured by the temperature measuring part does not fall within the specified temperature range based on the temperature stored in the memory, the computer is caused to further store the optimum recording power obtained from the reproduction signal of the area of the optical disk on which the test recording is performed in the real recording and the temperature measured by the temperature measuring part when obtaining the optimum recording power such that the optimum recording power is associated with the measured temperature.

13. A processor-readable storage medium storing an optical recording program executed by a computer of an optical disk apparatus having a light emitting element emitting a laser beam directed to a recordable optical disk, a driver rotating the optical disk, and a temperature measuring part measuring a temperature in the vicinity of the light emitting element, said optical recording program comprising the instructions of:

causing the computer to obtain an optimum recording power based on a reproduction signal in an area of the optical disk on which a test recording is performed, the test recording being performed such that the optical disk is rotated by the driver and output power of the light emitting element is varied;

causing the computer to store, in a memory, the obtained optimum recording power and the temperature measured by the temperature measuring part when obtaining the optimum recording power, such that the obtained optimum recording power is associated with the measured temperature;

causing the computer to obtain the optimum recording power according to the temperature measured by the temperature measuring part in real recording by referring to the optimum recording power and the temperature associated with the optimum recording power that are stored in the memory;

causing the computer to set, as a target recording power in the real recording, the optimum recording power obtained from the optimum recording power stored in the memory, causing the computer to obtain, in the real recording, the optimum recording power from the reproduction signal in the area of the optical disk on which the test recording is performed; and causing the computer to select, as the target recording power in the real recording, one of the optimum recording power obtained from the reproduction signal of the area of the optical disk on which the test recording is performed in the real recording, and the optimum recording power obtained from the optimum recording power stored in the memory, wherein, as for the instruction of causing the computer to set the target recording power, the selected optimum recording power is set as the target recording power in the real recording.

* * * * *